(12) United States Patent
Diab

(10) Patent No.: US 9,442,544 B2
(45) Date of Patent: Sep. 13, 2016

(54) FAST RESTART SLEEP SIGNATURE IN POWER OVER ETHERNET

(71) Applicant: Broadcom Corporation, Irvine, CA (US)

(72) Inventor: Wael William Diab, San Francisco, CA (US)

(73) Assignee: BORADCOM CORPORATION, Irvine, CA (US)

( * ) Notice: Subject to any disclaimer, the term of this patent is extended or adjusted under 35 U.S.C. 154(b) by 365 days.

(21) Appl. No.: 13/942,543

(22) Filed: Jul. 15, 2013

(65) Prior Publication Data

US 2014/0053011 A1 Feb. 20, 2014

Related U.S. Application Data

(60) Provisional application No. 61/684,119, filed on Aug. 16, 2012.

(51) Int. Cl.
*G06F 1/26* (2006.01)
*G06F 1/32* (2006.01)
*H04L 12/10* (2006.01)

(52) U.S. Cl.
CPC ............ *G06F 1/26* (2013.01); *G06F 1/266* (2013.01); *G06F 1/3209* (2013.01); *H04L 12/10* (2013.01)

(58) Field of Classification Search
CPC ......... G06F 1/26; G06F 1/266; H04L 12/10; H04L 12/40045; H04L 67/12
See application file for complete search history.

(56) References Cited

U.S. PATENT DOCUMENTS

| | | | |
|---|---|---|---|
| 2004/0032947 A1* | 2/2004 | Nattkemper | H04L 12/10 379/413 |
| 2004/0230846 A1* | 11/2004 | Mancey et al. | 713/300 |
| 2005/0044431 A1* | 2/2005 | Lang et al. | 713/300 |
| 2008/0168283 A1* | 7/2008 | Penning | G06F 1/263 713/310 |
| 2008/0278257 A1* | 11/2008 | Saar et al. | 333/17.3 |
| 2009/0265563 A1* | 10/2009 | Camagna et al. | 713/300 |
| 2010/0031066 A1* | 2/2010 | Geiger | H04L 12/10 713/300 |
| 2010/0042855 A1* | 2/2010 | Karam | 713/310 |
| 2012/0173900 A1 | 7/2012 | Diab et al. | |
| 2012/0317426 A1* | 12/2012 | Hunter et al. | 713/300 |
| 2013/0227306 A1* | 8/2013 | Santos | H04L 49/40 713/300 |
| 2015/0145324 A1* | 5/2015 | Heath | H04B 3/56 307/1 |

* cited by examiner

*Primary Examiner* — Jaweed A Abbaszadeh
*Assistant Examiner* — Gary Collins
(74) *Attorney, Agent, or Firm* — Foley & Lardner LLP; Christopher J. McKenna; Angela D. Murch

(57) ABSTRACT

An energy efficient sleep signature in power over Ethernet. In one embodiment, a signature of a powered device is first detected. It is then determined whether the detected signature is indicative of an unknown powered device. In one example, a detected signature of an approximately 25 kΩ impedance is indicative of an unknown powered device. Where the detected signature is indicative of an unknown powered device a normal PoE startup powering process can be used that includes a conventional detection, classification and powering process. Where the detected signature is indicative of a powered device that was previously known to the PSE, then powering of the PD can proceed with a fast-restart powering method that retains previous powering parameters.

20 Claims, 2 Drawing Sheets

FAST RESTART SLEEP SIGNATURE IN POWER OVER ETHERNET

This application claims priority to provisional application No. 61/684,119, filed Aug. 16, 2012, which is incorporated herein by reference in its entirety.

BACKGROUND

1. Field of the Invention

The present invention relates generally to network powering systems and methods and, more particularly, to an energy efficient sleep signature in power over Ethernet.

2. Introduction

Power over Ethernet (PoE) provides a framework for delivery of power from power sourcing equipment (PSE) to a powered device (PD) over Ethernet cabling. Various types of PDs exist, including voice over IP (VoIP) phones, wireless LAN access points, Bluetooth access points, network cameras, computing devices, etc.

In a PoE application such as that described in the IEEE 802.3af and 802.3 at (which are now part of the IEEE 802.3 revision and its amendments), a PSE can deliver power to a PD over multiple wire pairs. In accordance with IEEE 802.3af, a PSE can deliver up to 15.4 W of power to a single PD over two wire pairs. In accordance with IEEE 802.3 at, on the other hand, a PSE can deliver up to 30 W of power to a single PD over two wire pairs. Other proprietary solutions can potentially deliver higher or different levels of power to a PD. A PSE may also be configured to deliver power to a PD using four wire pairs.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
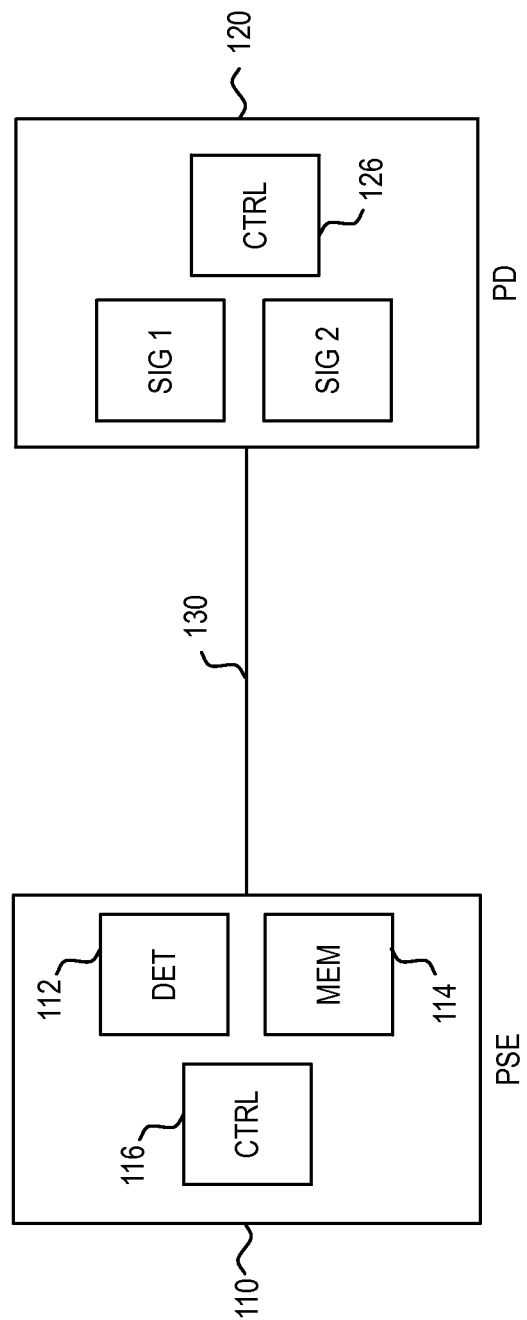
FIG. 1 illustrates an example embodiment of a powered device that can enable a fast restart powering process.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The power over Ethernet (PoE) process can be time consuming. After detection of a valid powered device (PD) through an identification of a signature impedance of approximately 25 k$\Omega$, the power sourcing equipment (PSE) can perform a power classification of the PD to identify a power budget that can be approved for powering of the PD. In one embodiment, the power classification process includes Layer 2 message passing between the PSE and PD to identify the particular power needs that are approved by the PSE. The completion of this power classification process enables the PSE to manage the power that is to be delivered to the PD under active powering.

In some application environments, the connectivity between the PSE and one or more PDs is relatively static. For example, in an automotive application an automotive network that incorporates electronic control units (ECUs), sensors, actuators, etc. to improve safety, reduce emissions, reduce fuel consumption, improve driver comfort, increase driver visibility of vehicle status, etc. is largely defined at a vehicle configuration stage and remains virtually unchanged throughout the usage of the automotive vehicle. The connection topology is therefore relatively static or fixed. Events where a new PD has to be discovered are relatively infrequent. For example, detection of a new PD may only be needed when a component in an automotive vehicle needs to be replaced as part of a maintenance or repair process.

In this context, the majority of up/down events in a PoE link would occur when the automotive vehicle is switched off or when energy savings are desired on the PoE link. In the present invention, it is recognized that as the majority of up/down events do not relate to a re-configuration of the components on a link, one or more elements of the discovery and classification process on the PoE link can be unnecessary. It is therefore a feature of the present invention that a PoE process can be modified to enable a fast-restart powering method.

In one embodiment, a signature of a powered device is first detected. It is then determined whether the detected signature is indicative of an unknown powered device. In one example, a detected signature of an approximately 25 k$\Omega$ impedance is indicative of an unknown powered device. Where the detected signature is indicative of an unknown powered device a normal PoE powering process can be used that includes a conventional detection, classification and powering process. Where the detected signature is indicative of a powered device that was previously known to the PSE, then powering of the PD can proceed with a fast-restart powering method that retains previous powering parameters. In one embodiment, the fast-restart powering method can use a classification of the PD that was determined prior to the detection of the PD.

In another embodiment, a power sourcing equipment is provided that includes a detection module that is configured for detecting a signature of a powered device, the powered device being coupled to a power sourcing equipment port of the power sourcing equipment via a network cable, and a controller that is configured to access a memory of the power sourcing equipment that stores one or more values that relate to a power profile of the powered device, the access of the controller to the memory occurring upon a first activation of the detection module on the power sourcing equipment port, wherein the power profile of the powered device is stored by the power sourcing equipment in the memory at a time subsequent to a second activation of the detection module, wherein the second activation of the detection module occurs prior to the first activation of the detection module.

In one embodiment, the detection module is configured to distinguish between a first impedance of approximately 25 k$\Omega$ and a second impedance having a value that is substantially different than 25 k$\Omega$. In another embodiment, the controller can be configured to access the power profile from the memory when the controller determines that the powered device was previously detected and classified by the power sourcing equipment. In various examples, the power profile can include a power classification of the powered device, a last saved state of the powered device, configuration of the powered device, historical power consumption of the powered device, etc.

PoE is generally designed to deliver power over one or more wire pairs used by a data transmission system. In various examples, PoE can be designed to deliver power via one wire pair, two wire pairs, four wire pairs, etc. As will become apparent, the principles of the present invention are not dependent on a particular number of wire pairs over which power is delivered.

Using a two wire pair example for illustration purposes, power can be delivered by a PSE to a PD through the application of a voltage across the center taps of data transformers that are coupled to a transmit wire pair and a data transformer that is coupled to a receive wire pair carried within an Ethernet cable. On the other end of the network link, power is received by the PD through the center taps of two data transformers.

In general, a PD can include a PoE module that contains the electronics that would enable the PD to communicate with a PSE in accordance with IEEE 802.3af, 802.3 at, legacy PoE transmission, or any other type of PoE transmission. The PD can also include a controller (e.g., pulse width modulation DC:DC controller) that controls a power transistor (e.g., field effect transistor (FET)), which in turn provides constant power to a load.

As noted, a conventional PoE process begins with a detection of a valid PD through the detection of a signature impedance of approximately 25 k$\Omega$. A valid detection would then trigger a classification process prior to active powering of the PD by the PSE. This classification process can be based on Layer 1 and/or Layer 2 communication protocols that seek to discover an amount of power desired by the PD. Active powering of the PD by the PSE can commence only after a successful negotiation of an amount of power that can be budgeted by the PSE to the particular power sourcing equipment port connected to the PD. This configuration process would occur each time the network link between the PSE and PD is activated.

This PoE process is typically applied to dynamic industrial environments where network devices are connected and disconnected as part of a dynamic network administration process. For example, an IT administrator can choose to re-deploy a wireless access point (WAP) to a new location, which would require disconnection of the WAP from a first network port to a second network port. As would be appreciated, the PoE process would be needed to ensure that proper powering of the various PDs in the network would be facilitated in an automated fashion.

In the present invention it is recognized that some environments in which PDs are deployed have network configurations that are relatively static in their network topology or connectivity. The automotive industry is one example of such a static environment where PDs (e.g., network camera, infotainment system, etc.) are largely fixed in their connection topology relative to a wiring harness within an automotive vehicle. In this environment, the rearrangement or addition of new network devices are quite rare as the automotive vehicle infrastructure is infrequently modified. For example, an automotive network environment can include multiple domains that can include those networked components that relate to a power train function, a chassis function, a body control function, a drive assist function, an infotainment function, etc. Each of these networked components are largely defined during a configuration of the automotive vehicle and would rarely be re-arranged or re-configured subsequent to delivery to the customer.

In the present invention, it is recognized that the PDs that exist within a relatively static network environment can be powered using a fast-restart method that retains previous powering parameters. As the fast-restart method would take a fraction of the time to complete as compared to a normal PoE power startup process, the user's experience is enhanced through a reduction in the waiting time before a PD is available for use. It is therefore a feature of the present invention that a fast-restart method can be defined that is enabled via an energy efficient sleep signature for PoE.

To illustrate such a feature, consider an automotive PD that undergoes a removal of active powering by a PSE. Such a change in powering can occur when the automotive vehicle is switched off, when the PD is manually switched off by the user, when the PD is switched off automatically to conserve power due to non-use, etc. In these various scenarios, the change in powering would conventionally require a full PoE powering process of detection and classification prior to the initiation of active powering by the PSE. Such a powering process would introduce substantial delays and can produce significant inconvenience and frustration to the user. For example, consider a video application (e.g., backup camera) that is delayed due to a lengthy configuration process.

FIG. 1 illustrates an example embodiment of a PD that can enable a fast restart powering process. As illustrated, PSE 110 is coupled to PD 120 via network cable 130. As noted, the particular implementation of network cable 130 is implementation dependent and can be embodied using one or more conductor pairs in various cable forms and types of Ethernet cables.

In distinguishing between a conventional startup process and a fast restart process, PSE 110 is configured to determine whether a detected signature is indicative of an unknown PD or a known, previously powered PD. In one embodiment, this determination is based on an analysis of a detected PD signature.

In the illustrated embodiment of FIG. 1, PD 120 includes signature 1 (SIG 1) element, signature 2 (SIG 2) element, and controller 126. In this embodiment, PD 110 is designed to present one of the two alternative signatures (SIG 1 or SIG 2) during the detection phase. In one embodiment, SIG 1 can represent a conventional 25 k$\Omega$ impedance, the detection of which would signal to the detection module 112 in PSE 110 that PD 120 is an unknown PD. A determination that the detected 25 k$\Omega$ signature is indicative of an unknown PD would lead controller 116 in PSE 110 to activate a conventional startup process to identify the parameters of operation for network powering.

In one embodiment, SIG 2 can represent a second signature that has an impedance that is distinct from the 25 k$\Omega$ impedance of SIG 1. As would be appreciated the particular value of SIG 2 would be dependent on the particular implementation of detection module 112 in being able to distinguish between two different signatures during a detection phase time period. What is significant in this embodiment is that SIG 2 is distinguishable from SIG 1, which would therefore provide an indication to detection module 112 that an alternate startup routine should be invoked by PSE 110.

In general the presentation of one of alternate signatures SIG 1 and SIG 2 is under the control of controller 126. In one embodiment, controller 126 can present SIG 1 as a default, and present alternate SIG 2 based on an indication that the connection between PSE 110 and PD 120 has been retained. In one example, PD 120 can retain a connection status or other indication of saved state that would enable PD 120 to determine that a fast restart process can be used. As would be appreciated, the particular mechanism used by PD 120 in retaining a connection status or indication of saved state would be implementation dependent.

In one embodiment, the presentation of SIG 2 by PD 120 can be dependent on an initial powering of PD 120 by PSE 110. For example, after PD 120 is initially powered, PD 120 can be configured to present SIG 2 up until a point in time where a disconnection conditions occurs between PD 120 and PSE 110. This scenario would ensure that SIG 2 is continued to be presented when, for example, PD 120 wakes up from a sleep mode or when PD 120 is awakened upon a startup of an automotive vehicle.

In one embodiment, PD 120 can be designed to present a single signature where the single signature is detected in association with a saved state that is retained by PSE 110. In one embodiment, PSE 110 can retain a connection status, power profile, etc. of the particular PD or PSE port in memory 114. With this retained connection status, power profile, etc., PSE 110 can then detect a signature that represents a combination of the impedance signature presented by PD 120 and the contents of memory in PSE 110. In this embodiment, different signatures can be detected using a single impedance signature presented by the PD. In one embodiment, a link energy pulse can be used by the PSE to periodically monitor whether an actual disconnection of the PD has occurred when the link is powered down. For example, the PSE can monitor the reflections to see if a disconnection has occurred. An indication of such a connection status can then be retained for use as part of the signature detection process.

Figure 2:
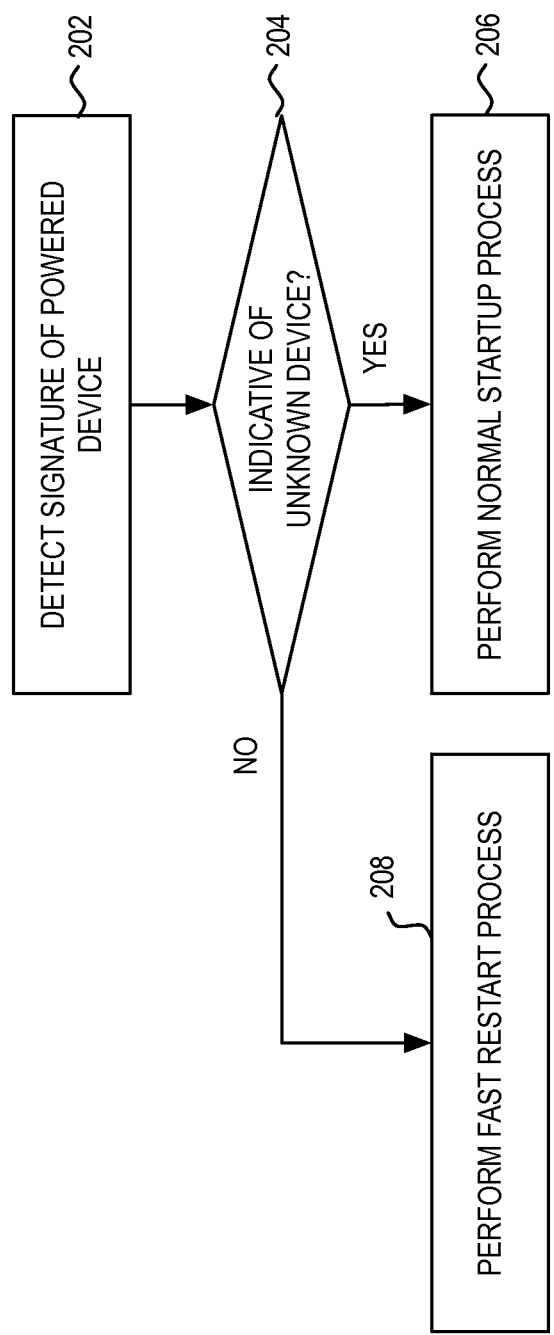
FIG. 2 illustrates a flowchart of an example process according to the present invention.

Having described an example embodiment of an energy efficient sleep signature in PoE, an example process is now provided with reference to the flowchart of FIG. 2. As illustrated, the process begins at step 202 where a PSE detects a PD signature. This detection can be based on an impedance measurement alone, or can be based on an impedance measurement in combination with a signature element retained in a memory of the PSE. Here, it should be noted that the particular signature components used can represent any combination of elements that are available to the PSE prior to and during the detection phase time period of the PoE startup process.

At step 204, an analysis of the detected signature is then performed. As would be appreciated, this specific mechanism used by this analysis can be dependent on the particular signature components that are being used. For example, where the only impedance component being used is an impedance measurement, then the analysis can be based on a threshold comparison of the impedance measurement of the PD to determine which of two potential signature impedances has been detected. Here, it should be noted that the impedance measurement can be based on multiple measurements to determine an impedance value.

In another example, the analysis can be primarily software driven where the primary distinguishing feature is a retained state within the PSE for the PD or PSE port. For example, a single 25 kΩ impedance detection can be a gating function to a further analysis of whether or not a retained state can be identified by the PSE. In one example, the retained state provides an indication of a connection status, where a disconnected status would lead to a normal startup process and a retained connection status would lead to a fast restart process. In general, the non-existence of some form of a retained state can indicate to the PSE that the PD is an unknown device that requires a full PoE startup process.

As illustrated in FIG. 2, the analysis of step 204 is designed to determine whether a normal startup process or a fast restart process is to be used. More specifically, if it is determined at step 204 that the detected signature is indicative of an unknown device, then a normal startup process is performed at step 206. In general, the normal startup process would be designed to identify the various powering needs and operating parameters of the PD. In various examples, the powering needs and operating parameters can include one or more of a desired power level, alternate power usage levels, potential fallback power levels during power disruption or other over-budget condition, disconnection parameters, startup or wake parameters, or any other parameter that can assist the PSE in effectively powering the PD. As would be appreciated, the identification of these various powering needs and operating parameters through Layer 1 or 2 communication protocols would significantly increase the startup time in establishing network powering of the PD.

If, on the other hand, it is determined at step 204 that the detected signature is indicative of a previously known PD, then a fast restart process is performed at step 208. A reduction in the startup time is therefore gained to the benefit of the user of the PD as the powering needs and operating parameters previously identified can be accessed from a power profile. Moreover, the power profile can include state information for the PD in identifying such performance characteristics as the historical power usage of the PD, previous operating state, diagnostic information, or the like, that can be accumulated over a period of time of operation. In general, the identification of a previously known PD enables a retention of state for future powering instances.

In various embodiments, the principles of the present invention can be applied to powering using different sets of conductor pairs. In that regard, it should be noted that the principles of the present invention can be applied to network powering using one-pair, two-pair, four-pair, etc. powering systems. As would be appreciated, the principles of the present invention can also be applied to various data transmission systems that communicate over the network cabling.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:
1. A method, comprising:
  detecting a signature of a powered device by a power sourcing equipment (PSE), the powered device coupled to the PSE via a network cable, the PSE configured to deliver power to the powered device via the network cable;

determining whether the detected signature is indicative that the powered device was previously known to the PSE or that the powered device was previously unknown to the PSE;

when the determination indicates that the powered device was previously unknown to the PSE, then using a first startup process including performing a classification of the powered device by the PSE prior to a delivery of power; and when the determination indicates that the powered device was previously known to the PSE, then using a second startup process including powering the powered device using a classification of the powered device previously performed by the PSE for the powered device.

2. The method of claim 1, wherein the detecting comprises measuring an impedance presented by the powered device.

3. The method of claim 2, wherein the detecting further comprises accessing a value stored in a memory device, the value being associated with the powered device.

4. The method of claim 2, wherein the detecting further comprises accessing a value stored in a memory device, the value being associated with the power sourcing equipment port.

5. The method of claim 1, wherein a determination that a powered device impedance is approximately 25 kΩ is indicative that the powered device was previously unknown to the PSE.

6. The method of claim 1, wherein a determination that a powered device impedance is substantially different than 25 kΩ is indicative that the powered device was previously known to the PSE.

7. The method of claim 1, wherein a stored value in memory is indicative that the powered device was previously known to the PSE.

8. The method of claim 7, wherein a stored value in memory identifies that the classification of the powered device was previously performed by the PSE.

9. The method of claim 7, wherein a stored value in memory identifies a power profile of the powered device that was previously determined by the PSE.

10. The method of claim 7, wherein a stored value in memory identifies a last saved state of the powered device that was previously stored by the PSE.

11. The method of claim 1, wherein the PSE and the powered device are located in an automotive vehicle.

12. A power sourcing equipment (PSE), comprising:
a port;
a detection module that is configured for detecting a signature of a powered device coupled to the port via a network cable;
a memory storing one or more values related to power profiles of known devices, wherein the values were determined by the PSE; and
a controller that is configured to:
access the memory to identify whether the signature is indicative that the powered device is one of the known devices;
when the determination indicates that the powered device is not one of the known devices, then use a first startup process including to perform a classification of the powered device prior to a delivery of power; and
when the determination indicates that the powered device was previously known to the PSE, then use a second startup process including to use a classification of the powered device previously performed by the PSE for the powered device.

13. The PSE of claim 12, wherein the detection module is configured to distinguish between a first impedance of approximately 25 kΩ and a second impedance having a value that is substantially different than 25 kΩ.

14. The PSE of claim 12, wherein the controller accesses one of the power profiles from the memory when the controller determines that the powered device was previously classified by the PSE.

15. The PSE of claim 12, wherein the values related to the power profiles reflect, for each of the known devices, a last saved state of the known device.

16. A method, comprising:
detecting a signature of a powered device at a power sourcing equipment (PSE) configured to deliver power to the powered device via a network cable;
determining from the signature whether the powered device was previously classified by the PSE;
when the determination indicates that the powered device was previously classified by the PSE, then powering the powered device using a classification of the powered device that was stored in a memory by the PSE prior to the detection of the signature of the powered device.

17. The method of claim 16, wherein the detecting comprises measuring an impedance presented by the powered device.

18. The method of claim 16, further comprising accessing a power profile of the powered device from the memory.

19. The method of claim 16, wherein the power profile includes a power classification of the powered device.

20. The method of claim 16, wherein the power profile includes a last saved state of the powered device.

* * * * *